(12) United States Patent
Motoyama

(10) Patent No.: US 7,779,700 B2
(45) Date of Patent: Aug. 24, 2010

(54) PRESSURE SENSOR

(75) Inventor: Hisao Motoyama, Minamisoma (JP)

(73) Assignee: Epson Toyocom Corporation (JP)

( * ) Notice: Subject to any disclaimer, the term of this patent is extended or adjusted under 35 U.S.C. 154(b) by 0 days.

(21) Appl. No.: 12/480,098

(22) Filed: Jun. 8, 2009

(65) Prior Publication Data

US 2009/0308167 A1  Dec. 17, 2009

(30) Foreign Application Priority Data

Jun. 11, 2008 (JP) ............................. 2008-153254
Feb. 9, 2009 (JP) ............................. 2009-027763

(51) Int. Cl.
*G01L 9/00* (2006.01)

(52) U.S. Cl. ........................................ 73/717

(58) Field of Classification Search ............... 73/504.4, 73/514.29, 717, 862.59, 778
See application file for complete search history.

(56) References Cited

U.S. PATENT DOCUMENTS

| | | | |
|---|---|---|---|
| 4,215,570 A | 8/1980 | EerNisse |
| 4,321,500 A | 3/1982 | Paros et al. |
| 4,372,173 A | 2/1983 | EerNisse et al. |
| 4,382,385 A | 5/1983 | Paros |
| 4,384,495 A | 5/1983 | Paros |
| 4,406,966 A | 9/1983 | Paros |
| 4,455,874 A | 6/1984 | Paros |
| 6,497,152 B2 | 12/2002 | Paros et al. |
| 6,595,054 B2 | 7/2003 | Paros et al. |
| 6,813,960 B1 * | 11/2004 | Owen et al. | ..................... 73/808 |
| 7,024,934 B2 * | 4/2006 | Yu | ............................ 73/514.37 |
| 7,467,553 B2 * | 12/2008 | Meyer | ...................... 73/514.29 |

FOREIGN PATENT DOCUMENTS

| | | |
|---|---|---|
| JP | 56-119519 | 9/1981 |
| JP | 64-009331 | 1/1989 |
| JP | 64-086608 | 3/1989 |
| JP | 02-228534 | 9/1990 |
| JP | 07-019981 | 1/1995 |
| JP | 08-159900 | 6/1996 |
| JP | 2004-347387 | 12/2004 |
| JP | 2005-017050 | 1/2005 |
| JP | 2005-121628 | 5/2005 |
| JP | 2006-194736 | 7/2006 |
| JP | 2007-057395 | 3/2007 |
| JP | 2007-132697 | 5/2007 |
| JP | 2008-232886 | 10/2008 |

* cited by examiner

*Primary Examiner*—Jewel Thompson
(74) *Attorney, Agent, or Firm*—Harness, Dickey & Pierce, P.L.C.

(57) ABSTRACT

A pressure sensor includes: a housing; a pressure input orifice opened at a pipe sleeve of the housing; a diaphragm sealing the pressure input orifice, the diaphragm having a first surface serving as a pressure receiving surface; a pressure sensitive unit using a direction of detecting a force as a detecting axis. A first end of the pressure sensitive unit is connected to a central area of a second surface of the diaphragm. A second end of the pressure sensitive unit is connected to the housing. The detecting axis is approximately orthogonal to the pressure receiving surface. A circumference of a portion where the central area and the first end of the pressure sensitive unit are in contact with each other is located inside a circumference of the central area. A thickness of the central area is larger than a thickness of an area surrounding the central area.

24 Claims, 9 Drawing Sheets

PRESSURE SENSOR

BACKGROUND

1. Technical Field

The present invention relates to a pressure sensor, in particular, a pressure sensor that does not use oil as a pressure receiving medium.

2. Related Art

There have been known pressure sensors using a piezoelectric resonator as a pressure sensitive element, such as a water pressure gauge, an air gauge, and a differential pressure gauge. For example, in a piezoelectric resonator, an electrode pattern is formed on a planar piezoelectric substrate, and a detecting axis is set in the direction of detecting a force. When pressure is applied to the piezoelectric resonator in the direction of the detecting axis, the resonance frequency of the piezoelectric resonator varies. The pressure is detected on the basis of the variation in the resonance frequency. JP-A-56-119519, JP-A-64-9331, and JP-A-2-228534 disclose pressure sensors using a piezoelectric resonator as a pressure sensitive element. When pressure is applied to a bellows via a pressure input orifice, a force F according to the effective area of the bellows is applied to the piezoelectric resonator as a compressive force or a tensile force via a force transmitting unit using a pivot (a flexible hinge) as a fulcrum. Stress corresponding to the force F occurs in the piezoelectric resonator. The resonance frequency of the piezoelectric resonator varies due to this stress. The pressure sensor measures the pressure by detecting the variation in the resonance frequency of the piezoelectric resonator.

Hereafter, a related-art pressure sensor will be described using examples disclosed in JP-A-56-119519 and the like. FIG. 13 is a schematic view showing a structure of a related-art pressure sensor.

A related-art pressure sensor 501 shown in FIG. 13 includes a case 504 having a first pressure input orifice 502 and a second pressure input orifice 503 made in an opposed manner and a force transmitting member 505 disposed inside the case 104. One ends of a first bellows 506 and a second bellows 507 are connected to one end of the force transmitting member 505 in such a manner that the one end of the force transmitting member 505 is interposed between these bellows. The other end of the first bellows 506 is coupled to the first pressure input orifice 502, and the other end of the second bellows 507 is coupled to the second pressure input orifice 503. Also, a double-ended tuning fork resonator 509 serving as a pressure sensitive element is disposed between the other end of the force transmitting member 505 and an end of a substrate 508 opposite to an end thereof serving as a pivot (fulcrum).

In general, a bellows of a pressure sensor is filled with a liquid so that pressure is detected with high accuracy. As such a liquid, oils having high viscosity, such as a silicon oil, are typically used in order to prevent bubbles from entering the bellows or staying in the folds thereof.

For this reason, the first bellows 506 is filled with an oil 510 having viscosity. If a liquid is the subject of pressure measurement, the liquid and the oil 510 make contact with and face each other via an opening 511 made at the first pressure input orifice 502. The diameter of the opening 511 is set to a size such that the oil 510 does not leak out.

In the pressure sensor 501 having the above-mentioned structure, when the pressure F is applied to the oil 510 filling the first bellows 506 by the liquid, which is the subject of pressure measurement, the pressure F is applied to the one end of the force transmitting member 505 (a swing lever supported by a pivot) via the first bellows 506. On the other hand, atmospheric pressure is applied to the second bellows 507. Thus, a force equivalent to the atmospheric pressure is applied to the one end of the force transmitting member 505.

As a result, a force that is equivalent to the differential pressure between the pressure F applied by the liquid, which is the subject of pressure measurement, and pressure based on the atmospheric pressure is applied to the double-ended tuning fork resonator 509 as a compressive force or a tensile force via the other end of the force transmitting member 505 using the pivot of the substrate 508 as a fulcrum. Thus, stress occurs in the resonator 509 and the resonance frequency of the resonator 509 varies with the magnitude of the stress. Therefore, by measuring the resonance frequency, the magnitude of the pressure F is detected.

JP-A-2005-121628 presents a pressure sensor that does not include a costly force transmitting unit (cantilever) having a swing lever using a pivot (flexible hinge) as a fulcrum, as used in the above-mentioned pressure sensor. In this pressure sensor, two bellows are aligned with a pedestal interposed therebetween in a housing. The pressure sensor is intended to detect a pressure variation attributable to the difference between pressures applied to the bellows on the basis of a movement of a pedestal along the direction of expansion or contraction of the bellows. Specifically, a resonator bonding pedestal is interposed between one end of a first bellows and one end of a second bellows. Both ends of a pressure sensitive element are fixed to the pedestal and a housing wall adjacent to the other end of the second bellows on the circumference of the second bellows. A reinforcing plate is disposed in such a manner that the reinforcing plate is symmetrical with the pressure sensitive element with respect to the second bellows. Both ends of the reinforcing plate are fixed to the pedestal and the housing wall.

In order to solve the problem that the bellows of the pressure sensor disclosed in JP-A-2005-121628 do not have sufficient strength against shock applied from a direction orthogonal to the direction of a pressure detecting axis, JP-A-2007-57395 proposes a pressure sensor where a pedestal and a housing are connected in a direction orthogonal to the direction of a pressure detecting axis using a reinforcing flexible member (that is, a spring).

JP-A-2006-194736 discloses a pressure sensor that is intended to detect hydraulic pressure inside an engine and is used in such a manner that it is fixed to an engine block. This pressure sensor includes a sensing unit for outputting an electrical signal according to an applied pressure, a pressure receiving diaphragm for receiving pressure, and a pressure transmitting member for transmitting the pressure from the diaphragm to the sensing unit. Specifically, a first diaphragm for receiving pressure is provided on one end surface of a hollow metal stem and a second diaphragm for detection is provided on the other end surface thereof. The pressure transmitting member is provided between the first and second diaphragms in the stem. The pressure transmitting member is a shaft made of metal or ceramic and is provided between the pair of diaphragms in a prestressed state. A chip with a strain gauge function of a pressure detection element is stuck on the outer end surface of the second diaphragm. Pressure received by the first diaphragm is transmitted to the second diaphragm by the pressure transmitting member so that the second diaphragm becomes deformed. The deformation of the second diaphragm is converted into an electrical signal by the strain gauge chip. Thus, the hydraulic pressure of the engine is detected.

JP-A-2007-132697 discloses a pressure sensor that includes: a pressure receiving diaphragm that has one surface serving as a pressure receiving surface on which pressure to be measured acts and that becomes distorted by receiving the pressure to be measured; a pressure transmitting member having one end in contact with the other surface of the pressure receiving diaphragm; a metal stem distortion portion to which the pressure to be measured transmitted from the pressure receiving diaphragm is applied via the pressure transmitting member; and a sensing unit that is a semiconductor chip for generating a signal on the basis of a distortion of the distortion portion. The pressure receiving diaphragm takes a waveform that is folded multiple times. In the pressure receiving diaphragm, the central area in contact with the pressure transmitting unit is thick and the area surrounding the thick central area takes a waveform. Thus, the mechanical strength of the diaphragm is improved while the spring characteristic thereof is ensured. The diaphragm is formed by means of stamping or cutting.

JP-A-08-159900 and JP-A-07-19981 propose specific configurations of pressure receiving diaphragms for use in a pressure sensor.

JP-A-08-159900 describes a diaphragm having recesses and protrusions in section. A thin, flat portion is provided in the center of the pressure receiving portion of the diaphragm. As shown in FIG. 1 of JP-A-08-159900, the thick peripheral area of the diaphragm restrains the influence on the central area, of a distortion caused when welding the diaphragm to the housing. Recesses and protrusions are made on the diaphragm by half-etching both surfaces of a thin metal plate.

JP-A-07-19981 describes a pressure-resistant sensor for high temperature where a pressure transmitting member is provided between the central area of a pressure receiving diaphragm for receiving pressure to be measured and a distortion sensitive element and the pressure is detected by transmitting a distortion of the pressure receiving diaphragm to the distortion sensitive element. In order to prevent the diaphragm from expanding and thus becoming deformed when the diaphragm is subjected to high temperature in an engine and thus causing an error in sensing, the central area that is originally thicker than the peripheral area of the diaphragm is recessed so that an output error attributable to a variation in the thermal distortion amount of the diaphragm caused by a variation in the temperature difference in the thickness direction of the diaphragm is reduced.

However, in JP-A-56-119519, JP-A-64-9331, and JP-A-2-228534, as shown by the pressure sensor 501 of FIG. 13, the oil 510 filling the first bellows first bellows 506 has a larger thermal expansion coefficient than those of other elements constituting the pressure sensor 501, such as the force transmitting member 505 and the double-ended tuning fork resonator 509. Therefore, when the temperature changes, thermal distortions occur in the elements constituting the pressure sensor 501. Such thermal distortions act on the double-ended tuning fork resonator 509 as unwanted stress, resulting in an error of a measured pressure value. Thus, the characteristics of the pressure sensor are disadvantageously degraded.

Also, the oil 510 filling the first bellows 506 makes contact with and faces a liquid, which is the subject of pressure measurement. Therefore, depending on how the pressure sensor is installed, the oil 510 may flow out toward the liquid or the liquid may flow into the first bellows 506. In this case, bubbles may occur in the oil 510. If bubbles occur in the oil 510, the oil 510 serving as a pressure transmitting medium can no longer stably transmit a force to the double-ended tuning fork resonator 509 via the force transmitting member 505. Thus, an error may occur in a measured pressure value.

Also, as described above, the oil 510 makes contact with and faces the liquid, which is the subject of pressure measurement; therefore, depending on how the pressure sensor is installed, the oil 510 may flow out toward the liquid. Therefore, disadvantageously, the related-art pressure sensor using the oil 510 cannot be used to measure the pressure of a pure liquid into which no foreign substance must be mixed.

Also, the related-art pressure sensor 501 includes the force transmitting member 505 having a complicated structure. This is an obstacle to downsizing the pressure sensor. Also, the force transmitting member 505 requires a flexible hinge having a slim constriction. This disadvantageously makes the force transmitting unit 505 a costly component, thereby increasing the manufacturing cost of the pressure sensor.

When the pressure sensors proposed by JP-A-2005-121628 and JP-A-2007-57395 are inclined, the bellows droop. Thus, a force applied to the pressure sensitive element such as a double-ended tuning fork resonator varies, resulting in a variation in the resonance frequency.

Also, in the pressure sensors proposed by JP-A-2005-121628 and JP-A-2007-57395, one end of a pipe filled with an oil is connected to a pressure introduction orifice and the other end of the pipe is brought into contact with a liquid to be measured. Therefore, as is the case with JP-A-JP-A-56-119519, JP-A-64-9331, and JP-A-02-228534, the oil filling the bellows and the pipe makes contact with and faces the liquid. Accordingly, depending on how the pressure sensors are installed, the oil may flow out toward the liquid or the liquid may flow into the bellows. In this case, bubbles may occur in the oil. If bubbles occur in the oil, the oil serving as a pressure transmitting medium can no longer stably transmit a force to the double-ended tuning fork resonator via the pedestal. This disadvantageously results in an error of the measured pressure value.

As for JP-A-2007-57395, the pedestal interposed between the bellows is supported on the lateral surface of the housing by the reinforcing flexible member, which is a plate spring. For this reason, when the bellows move in the axis direction, a force restraining a movement of the pedestal works. As a result, the pressure detecting sensitivity may be deteriorated. Also, if the hardness of the reinforcing flexible member is increased so that the reinforcing flexible member supports the pedestal more firmly, movements of the bellows are restrained. Thus, the pressure detecting sensitivity is disadvantageously deteriorated.

Also, in JP-A-2005-121628 and JP-A-2007-57395, the reinforcing plate is disposed in such a manner that it is symmetrical with the pressure sensitive element with respect to the bellows, so movements of the bellows are restrained. This disadvantageously deteriorates the pressure detecting sensitivity.

In JP-A-2006-194736 and JP-A-2007-132697, the prestressed diaphragm and center shaft are in contact with each other. If the diaphragm and center shaft are rigidly fixed in the pressure sensor that is used under high temperature and high pressure, the mechanism may be broken due to the difference in thermal expansion between these elements. Therefore, in consideration of such thermal expansion, the diaphragm and center shaft have only a point contact with each other and are not bonded together using an adhesive or the like. Therefore, there is a very high possibility that when the diaphragm and center shaft operate due to a variation in the pressure, the contact point is misaligned. If the contact point is misaligned, a force acting on both the diaphragm and center shaft leaks out. This disadvantageously prevents the pressure sensor from detecting the pressure with high accuracy. Also, the pressure sensors described in JP-A-2006-194736 and JP-A-2007-132697 are originally used under high temperature and high pressure. For this reason, it is desirable that the force transmitting member be as long as possible so as to secure a distance between the pressure receiving portion and the sensing unit so that thermal effect on such as a chip of the sensing unit is avoided. Therefore, it is not preferable to apply these pressure sensors to technologies for downsizing. Also, in JP-A-2006-194736 and JP-A-2007-132697, the center shaft is provided between the pair of diaphragms so that a force is transmitted, and the sensor chip is attached to the diaphragm in the sensing unit. For this reason, the properties of the portions adjacent to the pressure receiving portion, of the diaphragms are different from those of the portions adjacent to the sensing unit, thereof. This is a major disadvantage in that the measuring accuracy cannot be increased.

As for the diaphragm described in JP-A-08-159900, the central area of the pressure receiving surface is thin; therefore, when an external force such as pressure is applied to the central area, the central area is easily damaged. For this reason, the diaphragms having a thick central area, described in JP-A-2007-132697 and JP-A-07-19981, are considered. The related-art example described in JP-A-2007-132697 does not have the problems that the above-mentioned JP-A-56-119519, JP-A-64-9331, and JP-A-02-228534 have; however, it has, for example, a problem that the material of the diaphragm is limited only to metal such as stainless steel and a problem that such a material is not suited to downsizing, since the diaphragm is formed by means of stamping. Also, the waveform diaphragm formed by means of stamping, disclosed in JP-A-2007-132697, disadvantageously requires a process of eliminating residual stress applied to the diaphragm during stamping, as a post process. Further, if, in JP-A-2007-132697, an attempt is made to manufacture a diaphragm using the photolithography technique and etching technique (hereafter collectively referred to as "photolitho-etching") described in JP-A-08-159900, the front surface and back surface of the diaphragm are apt to be misaligned and therefore it is difficult to perform photolitho-etching with high yield, since both the diaphragms described in JP-A-2007-132697 and JP-A-08-159900 have a complicated structure. Also, the force transmitting unit according to JP-A-2007-132697 is point-connected to the diaphragm, so stress is concentrated on the portion where the pressure transmitting member and diaphragm are connected. Thus, aged deterioration is disadvantageously apt to occur.

As for JP-A-07-19981, the structure of the diaphragm shown in FIG. 1 thereof has the above-mentioned, stamping-related problem, as in JP-A-2007-132697. Also, the structures shown in FIGS. 2 to 6 thereof have a problem that a protection member serving as a heat shield plate must be provided on the pressure receiving surface of the diaphragm and thus the manufacturing process is complicated.

SUMMARY

An advantage of the invention is to provide a pressure sensor that uses no oil serving as a pressure receiving medium, is manufactured into a small size with fewer steps and with high yield, and is difficult to deteriorate with time and highly sensitive.

A pressure sensor according to a first aspect of the invention includes: a housing; a pressure input orifice opened at a pipe sleeve of the housing; a diaphragm sealing the pressure input orifice, the diaphragm having a first surface serving as a pressure receiving surface; a pressure sensitive unit using a direction of detecting a force as a detecting axis. A first end of the pressure sensitive unit is connected to a central area of a second surface of the diaphragm. A second end of the pressure sensitive unit is connected to the housing. The detecting axis is approximately orthogonal to the pressure receiving surface. A circumference of a portion where the central area and the first end of the pressure sensitive unit are in contact with each other is located inside a circumference of the central area. A thickness of the central area is larger than a thickness of an area surrounding the central area.

The above-mentioned configuration does not include oil as an element. Therefore, a problem such as oil leakage as described above does not occur. Also, the diaphragm gives a force to the pressure sensitive unit only in the direction of the detecting axis of the pressure sensitive unit, so the sensitivity of the pressure sensor is improved. Also, stress is concentrated not only on the circumference of the portion where the pressure sensitive unit and central area are connected but also on the circumference of the central area, so the concentration of the stress on the portion where the diaphragm and pressure sensitive unit are connected is reduced. Thus, the stress is reliably is transmitted to the pressure sensitive unit. This improves the sensitivity of the diaphragm, as well as reduces aged deterioration due to repeated concentration of stress. Also, the area surrounding the central area is thin and thus highly bendable, so a reduction in sensitivity caused by a reduction in bendability of the whole diaphragm is prevented.

In the pressure sensor according to the first aspect of the invention, the surrounding area preferably has a flat surface and there is preferably a step between the surrounding area and the central area.

Use of the above-mentioned configuration simplifies the manufacture of the diaphragm. Also, the distortion of the central area is reduced, so the concentration of the stress on the portion where the central area and pressure sensitive unit are connected is avoided. As a result, the detecting accuracy is improved.

In the pressure sensor according to the first aspect of the invention, the pressure sensitive unit preferably includes a force transmitting unit having a first end in contact with a central area of the second surface of the diaphragm, a movable unit fixed to the force transmitting unit, and a pressure sensitive element having a first end in contact with the fixing unit and a second end connected to the housing.

Thus, the pressure sensitive element receives a compressive force and a tensile force based on a force transmitted from the movable unit in a direction identical to that of the detecting axis of the pressure sensitive element and drag transmitted from the fixing means. As a result, the detecting efficiency of the pressure sensitive element is improved. Also, the pressure sensitive element receives a force transmitted from the diaphragm via the movable unit, so the pressure sensitive element is not influenced by the installation position of the diaphragm. Thus, various types of pressure sensors according to use objectives can be manufactured.

In the pressure sensor according to the first aspect of the invention, the pressure sensitive unit is preferably a pressure sensitive element having a first end connected to the central area of the second surface of the diaphragm and a second end connected to the housing.

By adopting the above-mentioned configuration, an external force received by the diaphragm is transmitted to the pressure sensitive element in a simple configuration. Also, unlike the configuration where the pressure sensitive unit includes a force transmitting unit, a movable unit, and a pressure sensitive element, the pressure sensitive element directly receives the force from the diaphragm not via the force transmitting unit or movable unit, so loss of the force is prevented and the sensitivity of the pressure sensor is improved. Also, the number of components is made smaller than that in the configuration where the pressure sensitive unit includes a force transmitting unit, a movable unit, and a pressure sensitive element, and the manufacturing process is simplified. As a result, the cost is reduced.

In the pressure sensor according to the first aspect of the invention, the area surrounding the central area is preferably formed by etching.

By adopting the above-mentioned configuration, materials other than metals, such as a piezoelectric material, can be used as the material of the diaphragm, so various types of pressure sensors according to use environments can be constructed. Unlike stamping, photolitho-etching facilitates formation of a downsized diaphragm. Also, no stress is applied to the material of the diaphragm during photolitho-etching and there is no need to perform a process of eliminating residual stress, so the pressure sensor is manufactured in a simplified manufacturing process. Also, photolitho-etching allows formation of the area surrounding the central area in one etching process, so downsized pressure sensors are formed without causing misalignment problems and with high yield.

In the pressure sensor according to the first aspect of the invention, the pressure sensitive element preferably includes base portions provided on both ends thereof and a vibrating portion provided between the base portions.

By configuring the pressure sensitive element as described above, the resonance frequency of the vibrating portion significantly varies due to a compressive force and a tensile force and the variable width of the resonance frequency is increased. As a result, a highly accurate pressure sensor having high resolution that allows detection of a small pressure difference is formed.

A pressure sensor according to a second aspect of the invention includes: a housing having a pressure input orifice; a diaphragm sealing the pressure input orifice of the housing, the diaphragm having an outer surface serving as a pressure receiving surface; a force transmitting unit connected to a central area of the diaphragm inside the housing, the force transmitting unit moving in a direction orthogonal to the pressure receiving surface of the diaphragm in conjunction with the diaphragm; and a pressure sensitive unit connected to the force transmitting unit and the housing, the pressure sensitive unit having a detecting axis set along an axis orthogonal to the pressure receiving surface of the diaphragm. By forming a groove on a flat plate, the diaphragm is formed so that the central area is thicker than an area surrounding the central area.

By adopting the above-mentioned configuration, the diaphragm makes a movement so that a force is given to the pressure sensitive unit only in the direction of the detecting axis of the pressure sensitive unit. As a result, the sensitivity of the pressure sensor is improved. Also, the concentration of the stress on the portion where the diaphragm and pressure sensitive unit are connected is reduced and the stress is reliably transmitted to the pressure sensitive unit, so the sensitivity of the diaphragm is improved and aged deterioration due to repeated concentration of stress is reduced. Also, the area surrounding the central area is thin and thus highly bendable, so a reduction in sensitivity caused by a reduction in bendability of the whole diaphragm is prevented. Also, the diaphragm is formed of a flat plate, so the manufacture of the diaphragm is advantageously significantly simplified.

In the pressure sensor according to the second aspect of the invention, the groove is preferably made on one surface of the diaphragm.

The above-mentioned configuration is advantageous in that a pressure sensor having good sensitivity is obtained and the manufacture of the diaphragm is facilitated.

In the pressure sensor according to the second aspect of the invention, the one surface on which the groove is made is preferably a surface to which the force transmitting unit is connected.

By adopting the above-mentioned configuration, the concentration of stress on the portion where the pressure sensitive unit and diaphragm are connected is reliably reduced.

In the pressure sensor according to the second aspect of the invention, the groove is preferably made on both surfaces of the diaphragm.

By adopting the above-mentioned configuration, the bending prevention effect of the thick portion of the diaphragm is made larger than that in a case where a groove is made on one surface.

A pressure sensor according to a third aspect of the invention includes: a housing; a pair of pressure input orifices coaxially disposed on opposed end face plates of the housing; first and second diaphragms each having an outer surface serving as a pressure receiving surface and sealing the pair of the pressure input orifices; a force transmitting unit connecting central areas of inner surfaces of the diaphragms inside the housing; and a pressure sensitive element having a first end connected to an intermediate portion of the force transmitting unit and a second end connected to the housing, the pressure sensitive element having a detecting axis disposed in parallel with an axis orthogonal to the pressure receiving surfaces of the diaphragms. By making grooves on flat plates, the diaphragms are formed so that the central areas to which the force transmitting unit is connected are made thicker than the areas surrounding the central areas.

By adopting the above-mentioned configuration, a downsized, oilless, relative pressure sensor is obtained. Also, the concentration of stress on the portion where the pressure sensitive unit and diaphragm are connected is reliably reduced.

A pressure sensor according to a fourth aspect of the invention includes: a housing; a pressure input orifice disposed at a first end face plate of the housing; a diaphragm having an outer surface serving as a pressure receiving surface, and sealing the pressure input orifice; a force transmitting unit disposed on an axis orthogonal to the pressure receiving surface of the diaphragm inside the housing, the force transmitting unit being connected to a central area of an inner surface of the diaphragm and a second end face plate opposed to the first end face plate; and a pressure sensitive element having a first end connected to an intermediate portion of the force transmitting unit and a second end connected to the housing, the pressure sensitive element having a detecting axis set to be coaxial with an axis orthogonal to the pressure receiving surface of the diaphragm. By making a groove on a flat plate, the diaphragm is formed so that the central area to which the force transmitting unit is connected is made thicker than an area surrounding the central area.

By adopting the above-mentioned configuration, a downsized, oilless, absolute pressure sensor is obtained. Also, the concentration of stress on the portion where the pressure sensitive unit and diaphragm are connected is reliably reduced.

In the pressure sensor according to the fourth aspect of the invention, a supporting pole is preferably provided in parallel with the detecting axis in the housing.

By adopting the above-mentioned configuration, only a force in the detecting axis direction acts on the pressure sensitive element. As a result, the detecting accuracy is improved.

In the pressure sensor according to the fourth aspect of the invention, the force transmitting unit is preferably a center shaft. The pressure sensitive element is preferably disposed in parallel with the center shaft.

By adopting the above-mentioned configuration, the height of the housing is reduced and thus the pressure sensor is further downsized.

In the pressure sensor according to the fourth aspect of the invention, the diaphragm is preferably fitted into a recess made on an outer surface of an end face plate of the housing so that the diaphragm is flush with the end face plate.

By adopting the above-mentioned configuration, the need to provide a protrusion on the housing is eliminated. As a result, the height of the housing is reduced and thus the pressure sensor is further downsized.

A pressure sensor according to a fifth aspect of the invention includes: a housing including first and second cases and a third case, the first and second cases forming opposed end face plates, the third case surrounding the first and second cases so that the third case forms a side face member; first and second diaphragms sealing pressure input orifices opened at the first and second cases; a center shaft connecting central areas of the first and second diaphragms in the housing so that the center shaft and the first and second diaphragms are integral with one another so as to enable a force to be transmitted; a movable pedestal fixed to the center shaft; a fixing pedestal provided on an inner surface of the housing; a pressure sensitive element having both ends attached to the movable pedestal and the fixing pedestal, the pressure sensitive element having a detecting axis set to be in parallel with the center shaft; and a plurality of supporting poles disposed around the center shaft, the supporting poles connecting the first and second cases. By making grooves on flat plates, the diaphragms are formed so that the central areas to which the center shaft is connected are made thicker than the areas surrounding the central areas.

By adopting the above-mentioned configuration, a downsized, oilless, relative pressure sensor is obtained. Also, only a force in the detecting axis direction acts on the pressure sensitive element, so the detecting accuracy is improved.

A pressure sensor according to a sixth aspect of the invention includes: a housing including first and second cases and a third case, the first and second cases forming opposed end face plates, the third case surrounding the first and second cases so that the third case forms a side face member; a diaphragm sealing a pressure input orifice opened at the first case; a center shaft connected to a central area of the diaphragm in the housing so that the center shaft and the diaphragm are integral with each other so as to enable a force to be transmitted; a movable pedestal fixed to an end of the center shaft; a fixing pedestal provided on an inner surface of the second case; a pressure sensitive element having both ends attached to the movable pedestal and the fixing pedestal, the pressure sensitive element having a detecting axis set to be coaxial with the center shaft; and a plurality of supporting poles disposed around the center shaft, the supporting poles connecting the first and second cases. By making a groove on a flat plate, the diaphragm is formed so that the central area to which the center shaft is connected is made thicker than an area surrounding the central area.

By adopting the above-mentioned configuration, a downsized, oilless, absolute pressure sensor is obtained. Also, only a force in the detecting axis direction acts on the pressure sensitive element, so the detecting accuracy is improved.

BRIEF DESCRIPTION OF THE DRAWINGS

The invention will be described with reference to the accompanying drawings, wherein like numbers reference like elements.

DESCRIPTION OF EXEMPLARY EMBODIMENTS

Now, pressure sensors according to embodiments of the invention will be described in detail with reference to the accompanying drawings. However, the elements, types thereof, combinations thereof, shapes thereof, relative positions thereof, and the like described in the embodiments are illustrative only unless these items are specified and the scope of the invention is not limited to these items.

Figure 1A:
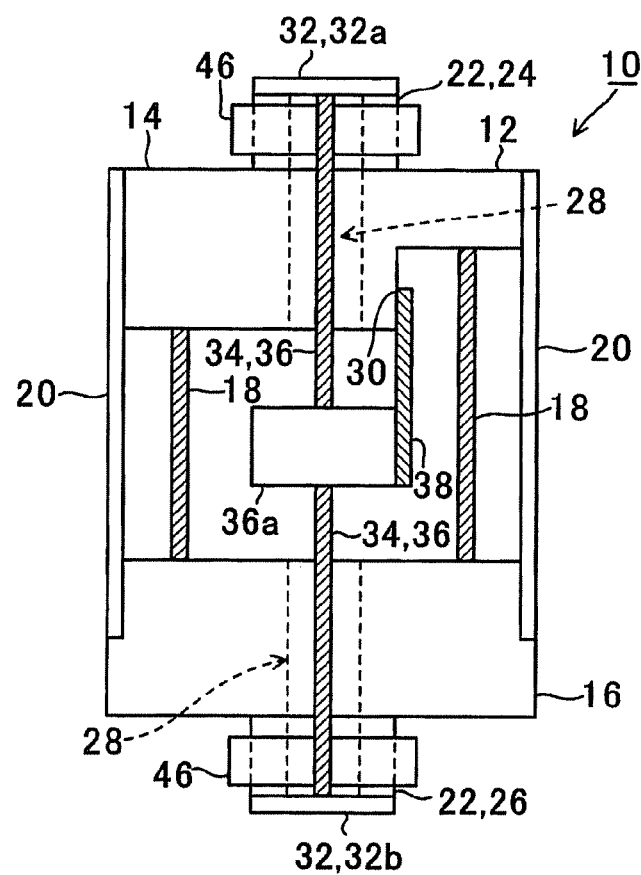
FIGS. 1A to 1C are sectional views of a pressure sensor according to a first embodiment of the invention.
Figure 1B:
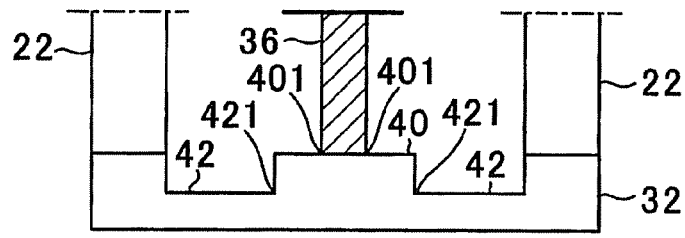
Figure 1C:
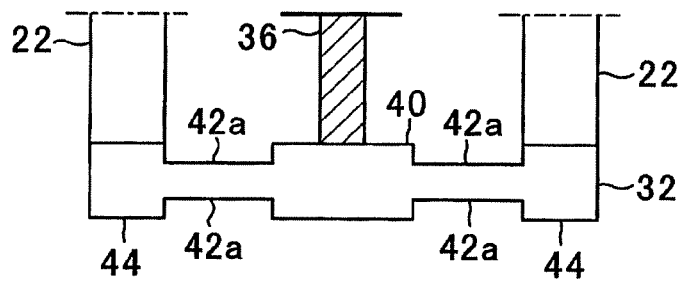

FIG. 1 is a pressure sensor according to a first embodiment of the invention. FIG. 1A is a schematic diagram of the pressure sensor, FIG. 1B is a detailed diagram of a diaphragm included in the pressure sensor, and FIG. 1C is a modification of the diaphragm. A pressure sensor 10 according to the first embodiment has a cylindrical external shape and includes a housing 12, a diaphragm 32, a center shaft 36 serving as a force transmitting unit 34 of a pressure sensitive unit, and a pressure sensitive element 38.

Since the elements (to be described later) are housed under vacuum in the sealed housing 12, the Q value of the pressure sensitive element 38 is increased and the resonance frequency thereof is stabilized. Thus, the long-term stability of the pressure sensor 10 is ensured.

The housing 12 includes a discoid first member 14 including an upper end face plate, a discoid second member 16 including a lower end face plate, supporting poles 18 joining the first member 14 and second member 16 together, a third member 20 forming a cylinder sidewall for surrounding the side surfaces of the first member 14 and second member 16.

The first member 14 and second member 16 have an identical diameter. The first member 14 and second member 16 are each provided with a pipe sleeve 22 that is located on a concentric circle thereof when seen from above. The pipe sleeves 22 protrude from the first member 14 and second member 16, respectively, and have a first pressure input orifice 24 and a second pressure input orifice 26, respectively. A via hole 28 passing through the first member 14 and first pressure input orifice 24 (second member 16 and second pressure input orifice 26) is made in the center of the concentric circle.

The supporting poles 18 have a given rigidity and are formed in positions where the first member 14 and second member 16 are opposed. By inserting the supporting poles 18 into dowel holes (not shown) having a shape corresponding to the external shape of the supporting poles 18 so as to join the members 14 and 16 together, rigidity is obtained among the first member 14, second member 16, and supporting poles 18. This prevents unnecessary deformation of the pressure sensitive element 38 (to be described later) during assembly of the pressure sensor 10 and during use thereof. While two supporting poles are shown in the drawing, one or three or more supporting poles may be used.

In order to reduce an error made by the pressure sensor 10 due to thermal expansion, the circumference of the portion housing the supporting poles 18 and pressure sensitive element 38, of the housing 12 is preferably made of metal or ceramic having a small thermal expansion coefficient.

Diaphragms 32 (first diaphragm 32a, second diaphragm 32b) are mounted on the first pressure input orifice 24 and second pressure input orifice 26 so that the via hole 28 is sealed. Also, the diaphragms 32 are exposed to the outside. The diaphragms 32 become distorted in accordance with the pressure of a liquid or gas, which is the subject of measurement.

Figures 4A, 4B:
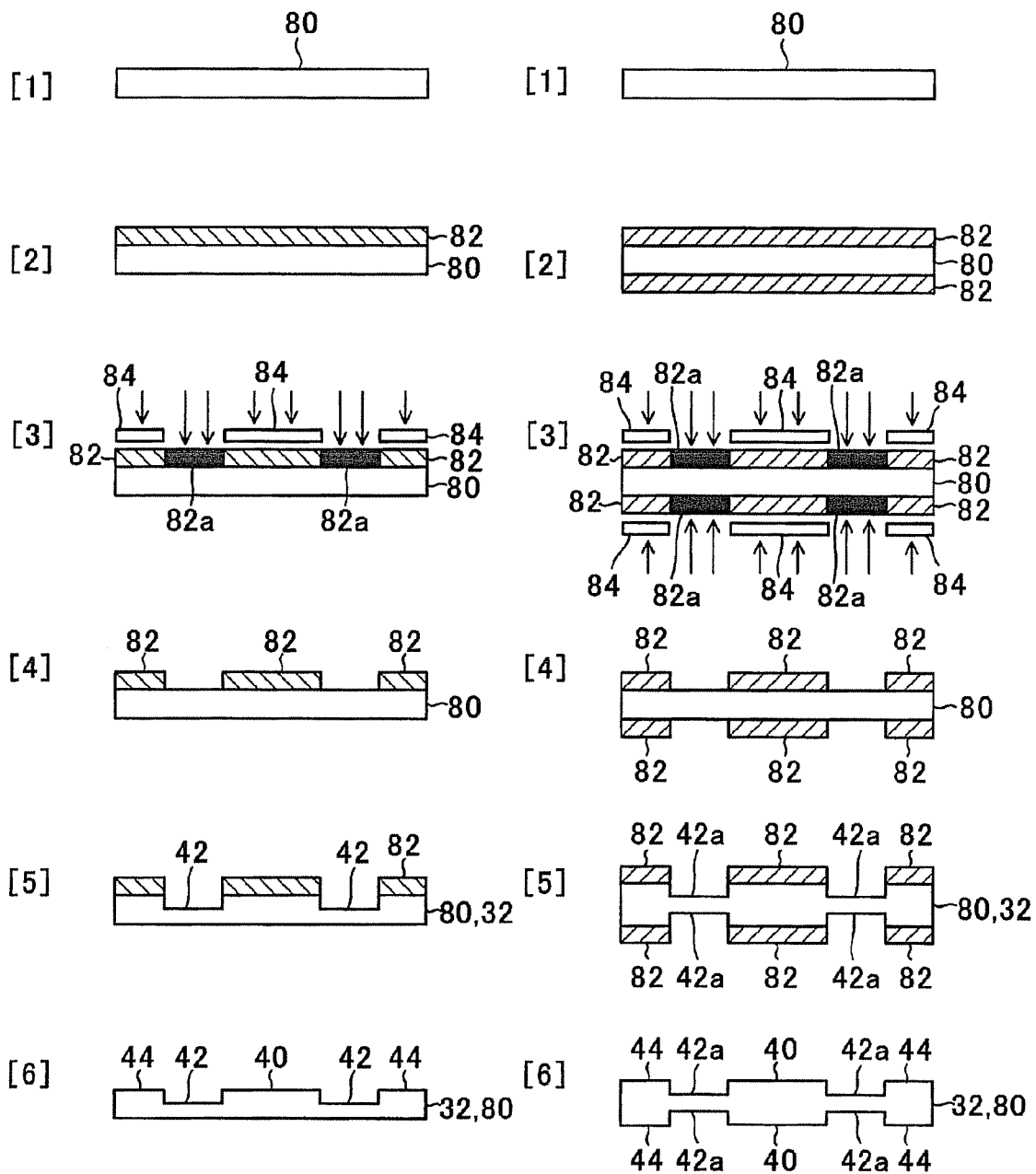
FIGS. 4A and 4B are drawings showing a process of manufacturing a pressure sensor according to the invention.

A first surface of each diaphragm 32 (first diaphragm 32a, second diaphragm 32b) is a pressure receiving surface facing the outside. When the pressure receiving surface of any diaphragm 32 receives external pressure, which is pressure to be measured, it becomes distorted. Thus, a force is applied to an end surface of the center shaft 36 that is in contact with a center area 40 of a second surface of the diaphragm 32 and serves as the force transmitting unit 34 (to be described later). As shown in FIG. 1B, each diaphragm 32 includes the thick center area 40, thin portion 42 surrounding the center area 40, and a peripheral area 44 surrounding the thin portion 42, all of which are formed in a concentric manner. The diaphragms 32 are preferably made of a highly corrosion-resistant material such as stainless steel or metal, or may be made of a monocrystal, such as a quartz crystal, or a non-crystal material. The diaphragms 32 having such a configuration are preferably formed by means of photolitho-etching, which generates no residual stress unlike stamping and is suitable for downsizing. In the photolitho-etching process, steps (1) to (6) shown in FIG. 4A are performed:

(1) A motherboard 80, which is the material of a diaphragm 32, is prepared.

(2) A positive photoresist 82 is applied to a surface of the motherboard 80.

(3) The photoresist 82 is exposed to light using photomasks 84 corresponding to the surface shape of the diaphragm 32.

(4) Development is performed so that a photoresist 82a is eliminated (5) A recess (thin portion 42a) is made by etching the exposed area of the motherboard 80 to a predetermined depth.

(6) The photoresist 82 is eliminated.

Also, as shown in FIG. 1C, the thin portion 42 may be formed by half-etching both surfaces of a substrate. In this process, steps (1) to (6) shown in FIG. 4B are performed:

(1) A motherboard 80, which is the material of a diaphragm 32, is prepared.

(2) A positive photoresist 82 is applied to both surfaces of the motherboard 80.

(3) The photoresist 82 on both surfaces of the motherboard 80 is exposed to light using photomasks 84 corresponding to the surface shape of the diaphragm 32. In this case, the photoresist on both surfaces may be exposed simultaneously or the photoresist on one surface and then that on another surface may be exposed.

(4) Development is performed so that an exposed photoresist 82a is eliminated.

(5) Recesses (thin portions 42) are made on both surfaces of the motherboard 80 by etching exposed areas of the motherboard 80 to a predetermined depth.

(6) The photoresist 82 is eliminated.

Assuming that both surfaces of the motherboard 80 are etched to an identical depth, the thin portion 42a is formed in one etching step. Also, if the thickness of the thin portion 42a is identical to that of the thin portion 42 formed by the above-mentioned single-side etching, etching is performed in half the time taken by the single-side etching.

A coating is applied to the exposed surface of the diaphragm so as to prevent corrosion of the surface by a liquid, a gas, or the like. For example, if a metal diaphragm is used, it may be coated with a nickel compound. If the diaphragm is made of a piezoelectric crystal such as a quartz crystal, it is preferably coated with silicon.

The center shaft 36 is joined to the first diaphragm 32a and second diaphragm 32b in such a manner that it passes through the via hole 28. Both ends of the center shaft 36 are joined to surfaces of the center areas 40 of the first diaphragm 32a and second diaphragm 32b perpendicularly. Therefore, if pressure is applied to the diaphragms 32, the center shaft 36, first diaphragm 32a, and second diaphragm 32b are displaced in an identical direction. At that time, a diaphragm 32 to which higher pressure has been applied is displaced into the housing 12; a diaphragm 32 to which lower pressure has been applied is displaced out of the housing 12. However, the length of the center shaft 36 does not change. Therefore, the absolute values of the inward displacement and outward displacement are equal. Also, a movable member 36a is fixed to a predetermined position of the center shaft 36 and is also displaced in a direction in which the center shaft 36 is displaced.

By using stainless steel, which is a material having stable strength, aluminum, ceramic, which is easy to process, or the like as the material of the center shaft 36 in accordance with the application of the pressure sensor, a highly accurate, stable pressure sensor is formed. In particular, if a metal or ceramic having a small thermal expansion coefficient is used as the material of the center shaft 36, the temperature characteristics of the pressure sensor substantially depend on the temperature characteristics of the pressure sensitive element. Also, the center shaft 36 preferably has circular ends, and the ends are connected to the center areas 40 in such a manner that the center shaft 36 forms concentric circles with the center areas 40. This prevents concentration of stress on a particular area of the portion where each center area 40 and the corresponding end of the center shaft 36 make contact with each other and on a particular area of the boundary between each center area 40 and corresponding thin portion 42. As a result, the sensitivity of the diaphragms 32 is improved.

The pressure sensitive element 38 is made of a piezoelectric material such as quartz crystal, lithium niobate, or lithium tantalite and is formed as a double-ended tuning fork resonator, a surface acoustic wave (SAW) resonator, a thickness shear resonator, or the like. Both ends of the pressure sensitive element 38 are connected to the movable member 36a and a fixing member 30 of the first member 14 so that the pressure sensitive element 38 is supported. The pressure sensitive element 38 has a detecting axis set in the direction of detection of a force. The direction linking both ends of the pressure sensitive element 38 is parallel to the detecting axis. Also, the pressure sensitive element 38 is electrically coupled to an oscillation circuit (not shown) attached to the housing 12, and oscillates at a resonance frequency specific to the pressure sensitive element 38 on the basis of an alternating voltage supplied from the oscillation circuit. When the pressure sensitive element 38 receives extensional (tensile) stress or compressive stress from the movable member 36a, the resonance frequency thereof varies. In particular, the resonance frequency of a double-ended tuning fork resonator element varies due to extensional stress or compressive stress to a much larger extent than those of a thickness shear resonator and the like. Also, the variable width of the resonance frequency of a double-ended tuning fork resonator element is larger than those of a thickness shear resonator and the like. Therefore, if it is desired to obtain a pressure sensor having excellent resolution such that a small pressure difference can be detected, a double-ended tuning fork resonator is preferably used. When a double-ended tuning fork resonator receives extensional stress, the amplitude width of an oscillating arm (vibration unit) thereof is reduced and thus the resonance frequency is increased; when the double-ended tuning fork resonator receives compressive stress, the amplitude width is increased and thus the resonance frequency is lowered. It is preferable to use a quartz crystal, which is a material having excellent temperature characteristics, as the material of a piezoelectric substrate of the double-ended tuning fork resonator.

In the pressure sensor having such a configuration, for example, male screw threads are cut on the circumference of any of the pipe sleeves 22 as shown in FIG. 1. Then, the pressure sensor is attached to a case containing a liquid or gas, which is the subject of measurement, using a fitting 46 or the like serving as a female screw corresponding to the male screw. Then, the corresponding diaphragm 32 is directly brought into contact with the subject of measurement. Depending on the magnitude of the pressure of a liquid or the like, which is the subject of measurement, or the structure of the case, a fitting 46 having a predetermined shape or a thick fitting 46 is required.

As is understood from the above description, the pressure sensor according to the first embodiment does not use oil as an element. Therefore, a problem such as oil leakage does not occur. Also, the force transmitting unit 34 transmits a force only in the direction of the end surfaces of the pressure sensitive element 38, so the sensitivity of the pressure sensor 10 is improved. Also, stress is concentrated not only on a circumference 401 of the portion where the force transmitting unit 34 and center area 40 make contact with each other but also on a circumference 421 of the center area 40, that is, the boundary between the center area 40 and thin portion 42. Thus, the concentration of stress on the portion where the diaphragm 32 and force transmitting unit 34 make contact with each other is reduced and the stress is reliably transmitted to the force transmitting unit 34. As a result, the sensitivity of the pressure sensor 10 is improved. Also, aged deterioration due to repeated stress concentration is reduced. Also, the portion (thin portion 42) outside the center area 40 is thin and has good bendability, so a pressure sensor 10 that is allowed to prevent a reduction in sensitivity due to a reduction in bendability of the whole diaphragm 32 is obtained. Also, the diaphragm 32 is formed by means of photolitho-etching, so a downsized pressure sensor 10 can be obtained.

Figure 2:
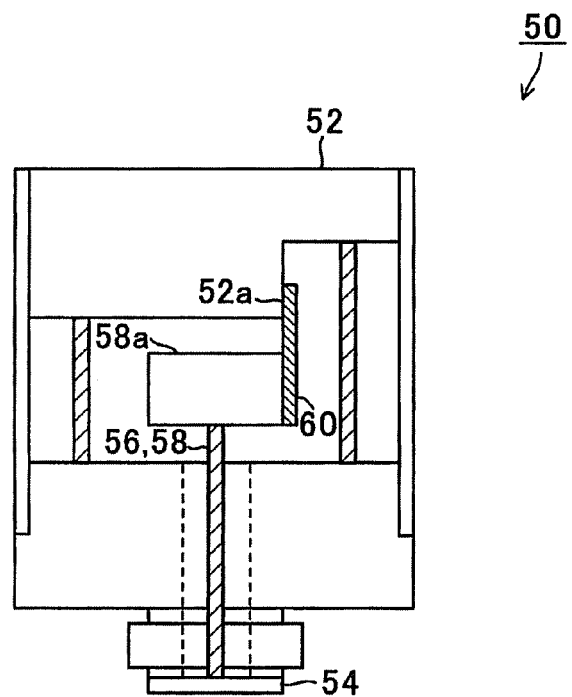
FIG. 2 is a sectional view of a pressure sensor according to a second embodiment of the invention.

FIG. 2 shows a pressure sensor 50 according to a second embodiment of the invention. While the pressure sensor 10 according to the first embodiment is intended to measure gauge pressure, which is indicated using atmospheric pressure as a zero reference, the pressure sensor 50 according to the second embodiment is intended to measure an absolute pressure, which is indicated using a vacuum as a zero reference. For this reason, the pressure sensor 50 includes a single diaphragm 136 connected to a housing 52, and a pressure sensitive unit including: a center shaft 58 that is connected to the diaphragm 54 and serves as a force transmitting unit 56; a movable member 58a fixed to the center shaft 58; a fixing member 52a fixed to the housing 52; and a pressure sensitive element 60, both ends of which are connected to the movable member 58a and fixing member 52a so that the pressure sensitive element 60 is supported. The housing 52 is vacuum-sealed.

If the external pressure is a vacuum, the pressure applied to the diaphragm 54 is zero and the diaphragm 54 is flat. If the external pressure is a certain level of pressure, the diaphragm 54 is displaced into the housing 52. Accordingly, the center shaft 58 and movable member 58a are displaced. Thus, a compressive force is applied to the pressure sensitive element 60 in the direction of the end surfaces thereof.

Figure 3:
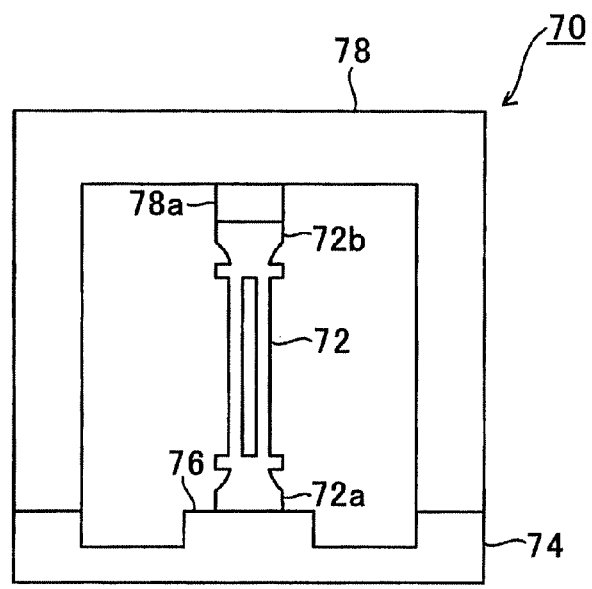
FIG. 3 is a sectional view of a pressure sensor according to a third embodiment of the invention.

FIG. 3 shows a pressure sensor 70 according to a third embodiment of the invention. The pressure sensor 70 according to the third embodiment is a modification of the second embodiment. In the pressure sensor 70, a pressure sensitive element constitutes a pressure sensitive unit. Specifically, a supporting portion 72a provided at a first end of a pressure sensitive element 72 is connected to a central area 76 of a diaphragm 74. A supporting part 72b provided at a second end thereof is connected to a fixing member 78a fixed to a housing 78. The housing is vacuum-sealed. This eliminates the need to provide the center shaft 36 and movable member 36a according to the first embodiment or the center shaft 58 and movable member 58a according to the second embodiment, thereby reducing the cost. Also, the pressure sensitive element 72 directly receives a displacement of the diaphragm 74 as a force not via a center shaft, so loss of the force is prevented and the sensitivity of the pressure sensor 70 is improved.

The inventor examined the relations between changes in width (diameter) of the central area and displacements of the central area and the relations between changes in width (diameter) of the central area and the maximum stress (bending stress) applied to the circumference of the portion where the diaphragm and center shaft are in contact. The diaphragm used in this examination was made of stainless steel and the thin portion was obtained by half-etching one surface of the diaphragm. The diameter of the diaphragm was 12 mm, the width of the peripheral area thereof was 1.2 mm, the diameter of the center shaft (disposition shown in FIG. 1B) connected to the central area was 2 mm, the thickness of the thin portion was 100 μm, and the thicknesses of the central area and peripheral area were 200 μm. The external pressure was atmospheric pressure. The interior (the center shaft is provided) of the housing on which the diaphragm was mounted was under vacuum. The width of the central area was changed between 2.1 mm and 8.0 mm.

Figure 5:
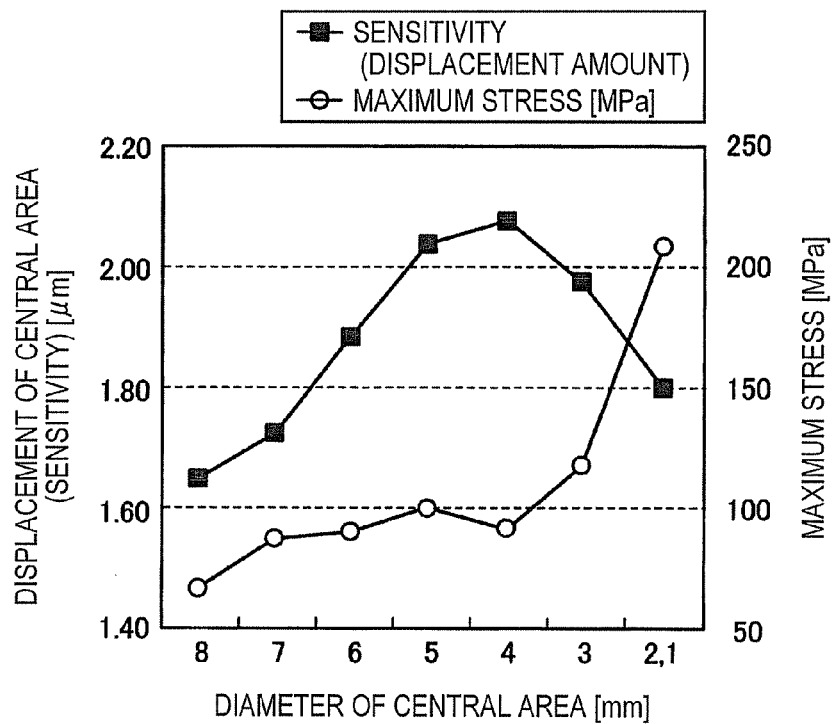
FIG. 5 is a graph showing displacements of the central area of a diaphragm and variations in the maximum stress applied to the diaphragm with respect to changes in width of the central area of the diaphragm.

FIG. 5 shows the maximum stress applied to the circumference 401 of the portion where the center area 40 and center shaft are in contact and displacements of the center area 40 with respect to changes in width of the center area 40. In FIG.

5, the lateral axis represents the width of the center area 40. That is, since the diameter of the diaphragm 32 is constant, that is, 12 mm, the width of the thin portion 42 is reduced (increased) as the width (diameter) of the center area 40 is increased (reduced). The left vertical axis represents displacements of the center area 40 and the right vertical axis represents the maximum stress applied to the circumference 401 of the portion where the diaphragm 32 and center shaft 36 are in contact. As the displacement of the center area 40 is increased, the sensitivity of the diaphragm is increased. Also, as the maximum stress is reduced, the stress is also distributed to the boundary 421 between the center area 40 and thin portion 42 without being concentrated only on the circumference of the contact portion. As the maximum stress is increased, the stress is concentrated on the circumference 401 of the contact portion.

As shown in FIG. 5, the maximum stress tends to be increased as the width of the center area 40 is reduced. In particular, when the diameter of the center area 40 becomes 3 mm or less, the maximum stress is increased abruptly. In this case, it is conceivable that the stress is concentrated not on the boundary but on the circumference of the contact portion.

Therefore, it is conceivable that if the diameter of the center area 40 is 3 mm or more when the diameter of the center shaft is 2 mm, the concentration of the stress on the contact portion is reduced. Note that if the diameter of the center area 40 is 4 mm and the width of the thin portion 42 is 2.8 mm, the sensitivity of the above-mentioned diaphragm is maximized.

Figure 6:
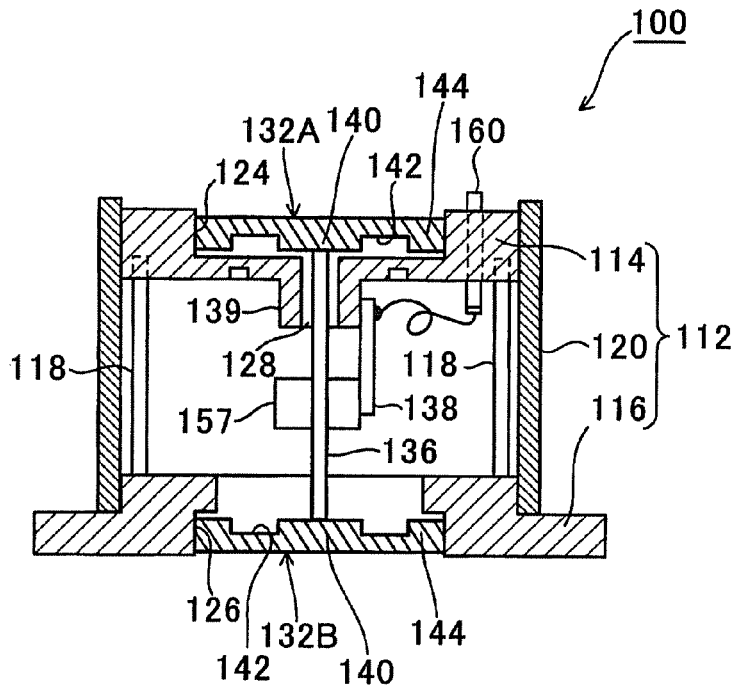
FIG. 6 shows a pressure sensor according to a fourth embodiment of the invention.
Figure 7:
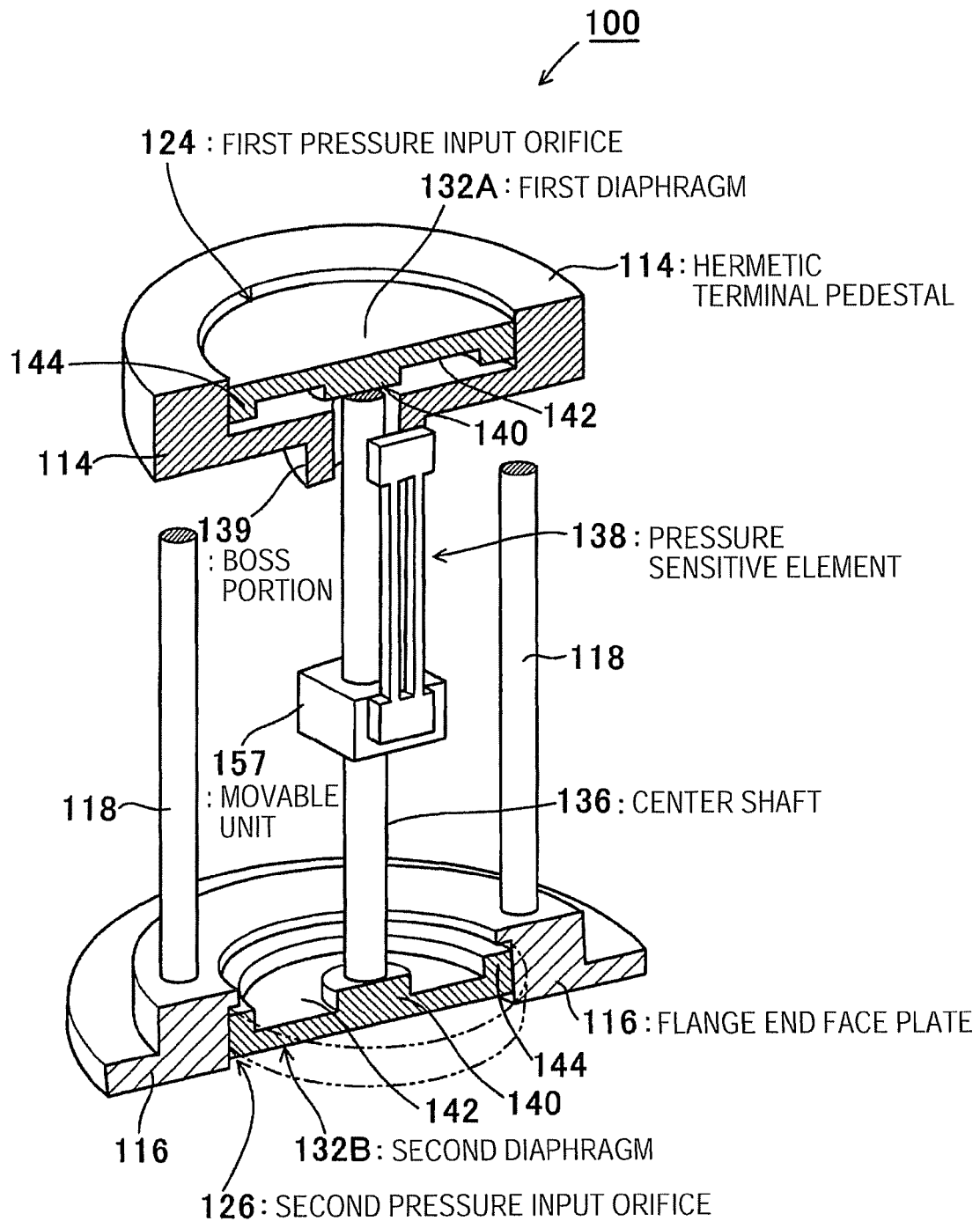
FIG. 7 is a cutaway perspective view of the pressure sensor according to the fourth embodiment.
Figure 8:
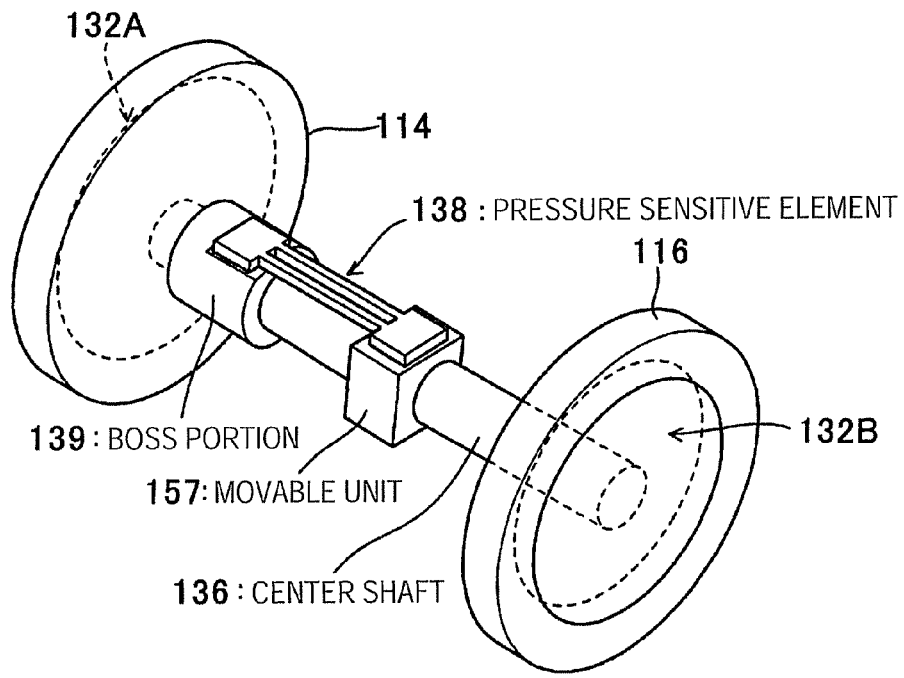
FIG. 8 is a schematic perspective view of a major element of the pressure sensor according to the fourth embodiment.

FIG. 6 shows a pressure sensor 100 according to a fourth embodiment of the invention. FIGS. 7 and 8 show a partial cutaway perspective view of the pressure sensor 100 and a major element perspective view thereof, respectively. The pressure sensor according to the fourth embodiment is a modification of the pressure sensor (FIG. 1A) for detecting relative pressure according to the first embodiment.

The pressure sensor 100 includes a housing 112, which is a hollow cylinder. The housing 112 is a hollow airtight case formed by surrounding a hermetic terminal board 114 as a first member (upper end face plate), a flange end face plate 116 as a second member (lower end face plate), which are disposed separately, with a cylinder sidewall 120 as a third member. A first pressure input orifice 124 and a second pressure input orifice 126 that are recesses and communicate with the interior of the housing are formed on the hermetic terminal board 114 and flange end face plate 116, respectively. A via hole 128 that is coaxial with the axis core of the housing 112 is made on the bottom plate of the hermetic terminal board 114 so that the interior of the housing communicates with the outside. A first diaphragm 132a and a second diaphragm 132b are fitted into the first pressure input orifice 124 and second pressure input orifice 126, respectively. The circumferences of these diaphragms are integrally coupled to the hermetic terminal board 114 and flange end face plate 116, respectively, so that the interior of the housing is shielded from the outside. The first diaphragm 132A on the hermetic terminal board 114 is intended to set atmospheric pressure and the second diaphragm 132B on the flange end face plate 116 is intended to receive pressure. As is the case with the first embodiment, the housing 112 having such a configuration is also sealed and the interior thereof is maintained under vacuum using an air vent unit (not shown).

Inside the housing 112, a center shaft (a force transmitting unit) 136 connecting the center areas of the inner surfaces of the first diaphragm 132A and second diaphragm 132B is disposed along the axis core of the housing 112. The center shaft 136 is joined to the diaphragms 132A and 132B via the via hole 128. A movable unit 157 serving as a pressure sensitive element pedestal is integrally provided on an intermediate part of the center shaft 136. A first end of a pressure sensitive element 138, which is a double-ended tuning fork resonator having a detecting axis set to be in parallel with an axis orthogonal to the pressure receiving surfaces of the diaphragms 132 (132A and 132B), is attached to the movable unit 157. A second end thereof is connected to a boss portion 139 that is provided on the hermetic terminal board 114 of the housing 112, projects inwardly, and serves as a pressure sensitive element pedestal. Thus, when the center shaft 136 moves in the axis direction due to a pressure difference between the second diaphragm 132B for receiving pressure and the first diaphragm 132A for atmospheric pressure, the movable unit 157 is displaced accordingly. A force generated by this displacement generates an acting force of the pressure sensitive element 138 in the detecting axis direction.

The diaphragms 132 according to the fourth embodiment are each formed by digging a circumferential groove 142 around a central area 140, to which the center shaft 136 is to be connected, by performing photolitho-etching on one surface of the motherboard 80, which is a flat plate, as shown in FIG. 4A. Thus, a step is made between the central area 140, to which the center shaft 136 serving as a force transmitting unit is to be connected, and the area surrounding the central area 140 so that the central area 140 is thicker than the surrounding area. In this case, diaphragms similar to the diaphragms (FIG. 1B) according to the first embodiment where a groove is dug into one surface are used as the diaphragms 132. By digging the circumferential groove 142 into a flat plate, the central area 140 and a peripheral area 144 become thick portions having an identical thickness and the portion where a groove 143 is made becomes a thin portion.

Inside the housing 112, multiple supporting poles 118 are disposed around the center shaft 136 in parallel with the center shaft 136. As with the first embodiment, these supporting poles keep constant the interval between the flange end face plate 116, which is the second member, and the hermetic terminal board 114, which is the first member, and prevent a reduction in the detecting accuracy due to deformation of the housing 112 caused by an external force or due to an arbitrary posture of the housing 112.

In the fourth embodiment, the hermetic terminal board 114 is used as the upper end face plate and a hermetic terminal 160 is passed through the hermetic terminal board 114 so that a signal generated by the pressure sensitive element 138 is taken out.

By adopting the fourth embodiment having such a configuration, the pair of diaphragms 132 are coupled via the center shaft 136, and the movable unit 157 provided on the intermediate portion of the center shaft 136 moves (this movement is a movement attributable to the difference between the pressures received by the pair of diaphragms 132A and 132B) in the shaft axis direction in accordance with the movement of the diaphragms 132, together with the center shaft 136. This movement generates an acting force of the pressure sensitive element 138, which is a double-sided fork tune resonator, in the detecting axis direction. As a result, there is formed a pressure sensor that uses no oil and has high detecting accuracy and that is downsized and easy to assemble. Also, the flange end face plate 116, hermetic terminal board 114, and a cylinder sidewall 120 form the housing 112, which is a vacuum case. The hermetic terminal board 114 is integral with the first diaphragm 132A and the flange end face plate 116 is integral with the second diaphragm 132B. Thus, the pressure sensor is easily assembled. In order to attach the pressure sensor 100 to a case used to sink (immerse) the pressure sensor 100 into a liquid to be measured, the flange end face plate 116 is surface-bonded to the case with an O ring therebetween and bolting is performed. The O ring is disposed in such a manner that it surrounds the second diaphragm 132B. With regard to this attachment work, the pressure sensor according to this embodiment is not configured so that a pipe sleeve including a diaphragm, to which a center shaft is connected, is screwed to a case, unlike that according to the first embodiment. This prevents a failure such as one where tensile force is given to the pressure sensitive element due to the expansion of the center shaft.

Also in the fourth embodiment, the center shaft 136 and movable unit 157 serving as a pedestal for fixing a pressure sensitive element may be an integral unit obtained by cutting one member. This prevents the movable unit 157 from moving from the portion where the movable unit 157 is fixed to the center shaft 136.

In the fourth embodiment, the central areas 140 of the pair of diaphragms 132, to which the center shaft 136 is connected, are made thicker than the areas surrounding the central areas 140. Therefore, when pressure is received, stress is concentrated on the step between the thin portion and thick portion. While the thick central area 140 is displaced vertically when receiving the pressure, it is bent to a lesser extent. Thus, concentration of the stress on the portion where the center shaft 136 and diaphragm 132 are joined together is avoided. This prevents an unnecessary force in a direction different from the axis direction from acting on the center shaft 136. As a result, the pressure detecting accuracy is improved.

Also, in the fourth embodiment, the diaphragms 132 are fitted into the first pressure input orifice 124 and second pressure input orifice 126, which are recesses made on the outer surfaces of the hermetic terminal board 114 and flange end face plate 116, respectively. Therefore, the housing 112 has no protrusion and thus the size thereof is reduced. This facilitates downsizing of the pressure sensor.

Figure 9:
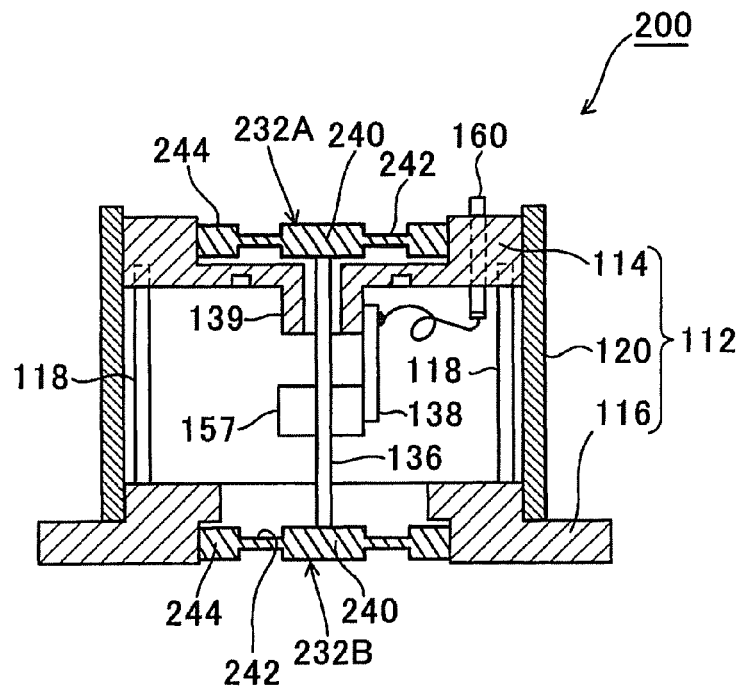
FIG. 9 shows a pressure sensor according to a fifth embodiment of the invention.
Figure 10:
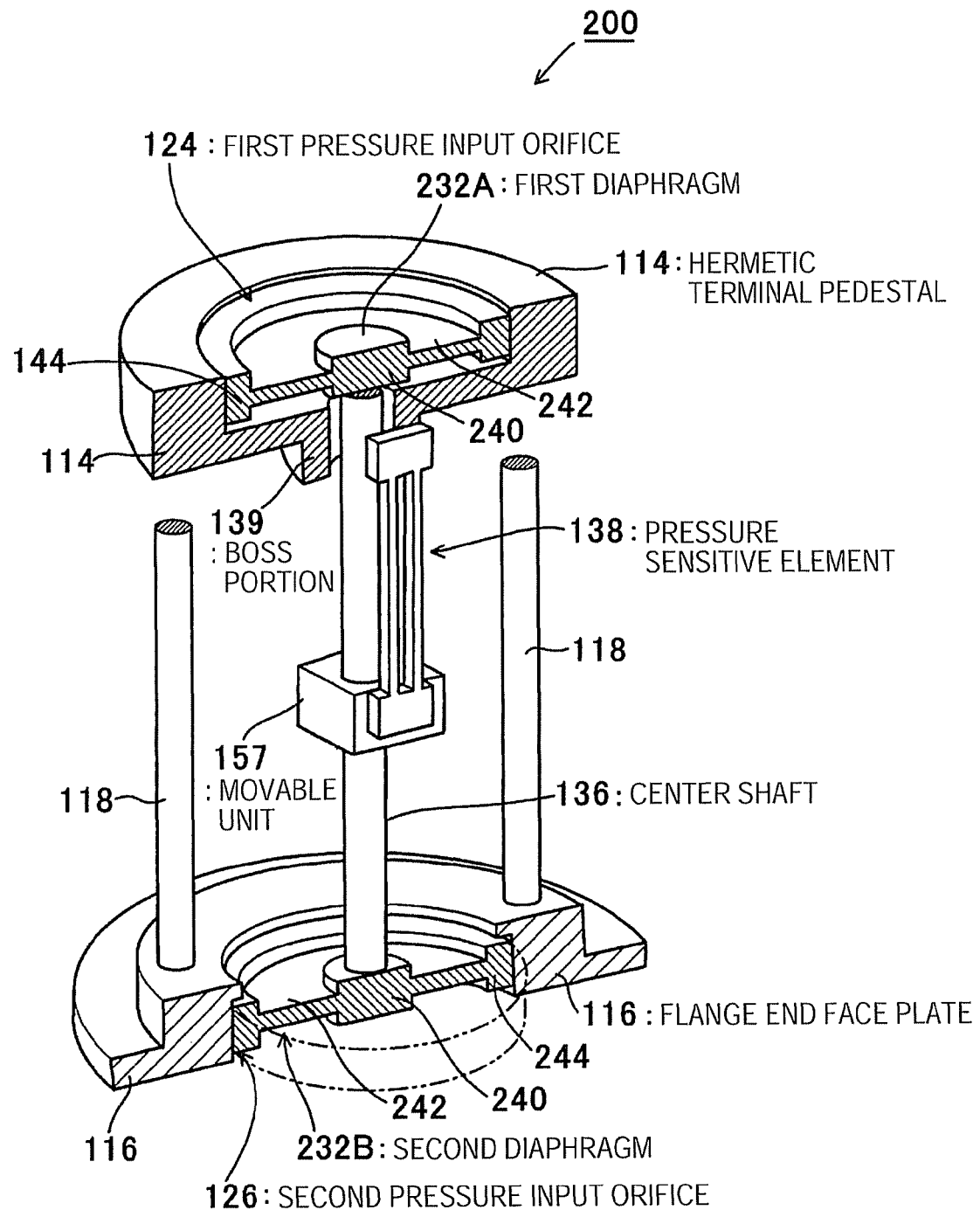
FIG. 10 is a cutaway perspective view of the pressure sensor according to the fifth embodiment.

Next, FIGS. 9 and 10 show a pressure sensor 200 according to a fifth embodiment of the invention. While the diaphragms 132 according to the fourth embodiment each have the circumferential groove 142 dug on one surface thereof, diaphragms 232 (232A, 232B) according to the fifth embodiment each have a circumferential groove 242 dug on both surfaces thereof. Except for that point, the fifth embodiment is the same as the fourth embodiment, so same elements will be assigned same reference numerals and will not be described.

In the pressure sensor 200 according to the fifth embodiment, the circumferential groove 242 is dug into both surfaces of an area surrounding a center area 240 of each diaphragm 232, and the center area 240 and a peripheral area 244 are thick portions and the portion on which the circumferential groove 242 is made is relatively thin. Therefore, if each diaphragm 232 receives pressure and thus becomes distorted, the flatness of the center area 240 thereof is maintained. Thus, a force in the axis direction is more accurately transmitted to the center shaft 136 connected to the center area 240. As a result, the detecting accuracy is improved. In particular, the front surface and back surface of each diaphragm 232 are symmetrical, so the diaphragms 232 are very easy to assemble as components.

Figure 11:
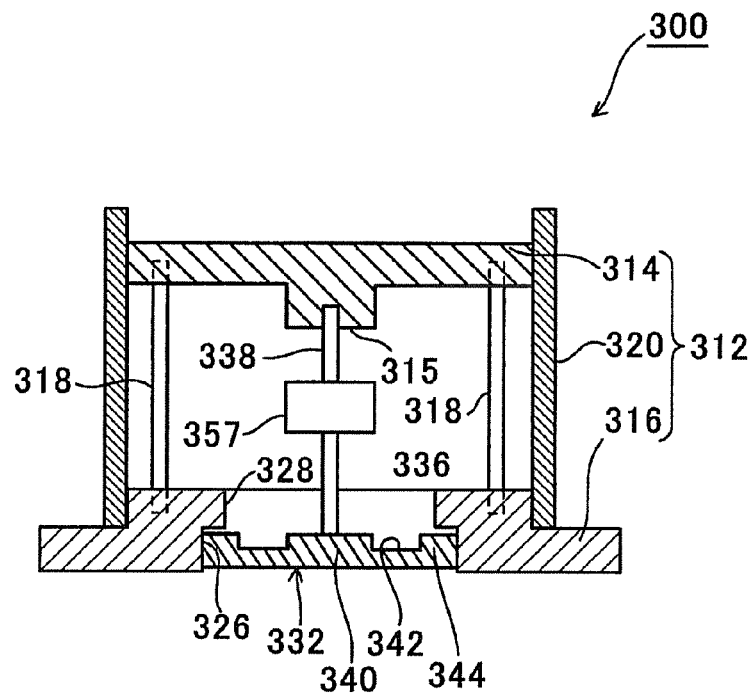
FIG. 11 is a sectional view of a pressure sensor according to a sixth embodiment of the invention.

FIG. 11 shows a sectional view of a pressure sensor 300 according to a sixth embodiment of the invention. In an example shown in the drawing, there is shown a pressure sensor that is intended to detect an absolute pressure and uses a diaphragm formed in such a manner that the central area, to which a center shaft is to be connected, is thicker than the area surrounding the central area by making a circumferential groove on one surface of a flat plate. That is, the pressure sensor 300 is formed by eliminating the first diaphragm 132A for detecting atmospheric pressure from the pressure sensitive unit according to the fourth embodiment and then sealing the housing the first member only as a hermetic terminal pedestal. Also, the pressure sensor according to the fifth embodiment is different from those according to the above-mentioned embodiments in that the center shaft and pressure sensitive element are coaxially disposed on an axis passing through the central area of the diaphragm for receiving pressure.

The pressure sensor 300 includes a housing 312, which is a hollow cylinder. The housing 312 is a hollow cylinder formed by using a hermetic terminal pedestal 314 as a first member (upper end face plate) and using a flange end face plate 316, which is similar to that according to the fourth embodiment, as a second member (lower end face plate), and surrounding these separately disposed end face plates with a cylinder sidewall 320. A pressure input orifice 326 communicating with the interior of the housing is passed through the flange end face plate 316 in such a manner that the pressure input orifice 326 is coaxial with the axis core of the housing 312. Thus, the pressure input orifice 326 forms a recess. The central portion of the recess is a via hole 328. The diaphragm 332 is fitted into the recess so that the interior of the housing is shielded from the outside. The diaphragm 332 is bonded to the inner wall of the pressure input orifice 326 so that it is integrally coupled to the flange end face plate 316. The diaphragm 332 is intended to receive the pressure of a liquid to be measured. The hermetic terminal board 314 is formed as an end face plate where none of a pressure input orifice and a diaphragm is provided. As with the other embodiments, the housing 312 having such a configuration is also sealed and the interior thereof is maintained under vacuum using an air vent unit (not shown).

Inside the housing 312, a center shaft (a force transmitting unit) 336 is vertically provided on a center area 340 of the inner surface of the diaphragm 332 along the core axis of the housing 312. A movable unit 357 serving as a pressure sensitive element pedestal is integrally provided at the tip of the center shaft 336. A first end of a pressure sensitive element 338, which is a double-ended tuning fork resonator having a detecting axis coaxial with the center shaft 336, is attached to the movable unit 357. A second end thereof is connected to a pedestal 315 that is provided on the central area of the hermetic terminal board 314 of the housing 312 and projects inwardly. Thus, when the diaphragm 332 for receiving pressure receives pressure and thus becomes distorted, the center shaft 336 moves in the axis direction. This movement generates an acting force of the pressure sensitive element 338 connected to the movable unit 357 in the detecting axis direction.

As shown in FIG. 4A, the diaphragm 332, to which the center shaft 336 is to be connected, is formed by digging a circumferential groove 342 into the area surrounding the central area 340, to which the center shaft 336 is to be connected, by performing photolitho-etching on one surface of the motherboard 80, which is a flat plate. Thus, the central area 340, to which the center shaft 336 serving as a force transmitting unit is to be connected, is formed in such a manner that it becomes thicker than the area surrounding the center shaft 336 by a step. A diaphragm similar to the diaphragm (FIG. 1B) according to the first embodiment where a groove is dug into one surface is used as the diaphragm 332. By digging the circumferential groove 342 into a flat plate, the central area 340 and a peripheral area 344 become thick portions having an identical thickness and the portion where a groove 343 is made becomes a thin portion.

Also, in the above-mentioned housing 312, multiple supporting poles 318 are disposed around the center shaft 336 in parallel with the center shaft 336. As with the other embodiments, these supporting poles keep constant the interval between the flange end face plate 316, which is the second member, and the hermetic terminal board 314, which is the first member, and prevent a reduction in the detecting accuracy due to deformation of the housing 312 caused by an external force or due to an arbitrary posture of the housing 312.

Also in the sixth embodiment, the hermetic terminal board 314 is used as the upper end face plate and a hermetic terminal (not shown) is passed through the hermetic terminal board 314 so that a signal generated by the pressure sensitive element 338 is taken out, as in the fourth embodiment.

By adopting the sixth embodiment having such a configuration, the flange end face plate 316, hermetic terminal pedestal 314, and cylinder sidewall 320 form the housing 312, which is a vacuum case, and the flange end face plate 316 and diaphragm 332 are integral with each other. Thus, the pressure sensor is easily assembled. The diaphragm 332 for receiving pressure and center shaft 336 are connected concentrically in a line. The movable unit 357 provided at the tip of the center shaft 336 moves in the shaft axis direction in accordance with a movement of the diaphragm 332. This movement generates an acting force of a pressure sensitive element 338, which is a double-sided fork tune resonator, in the detecting axis direction. Therefore, a pressure sensor that uses no oil and has high detecting accuracy and is small and easy to assemble is formed.

Also, in the sixth embodiment, the center shaft 336 and the movable unit 357 serving as a pedestal for fixing a pressure sensitive element may be an integral unit obtained by cutting one member. This prevents the movable unit 357 from moving from the portion where the movable unit 357 is fixed to the center shaft 336.

Figure 12:
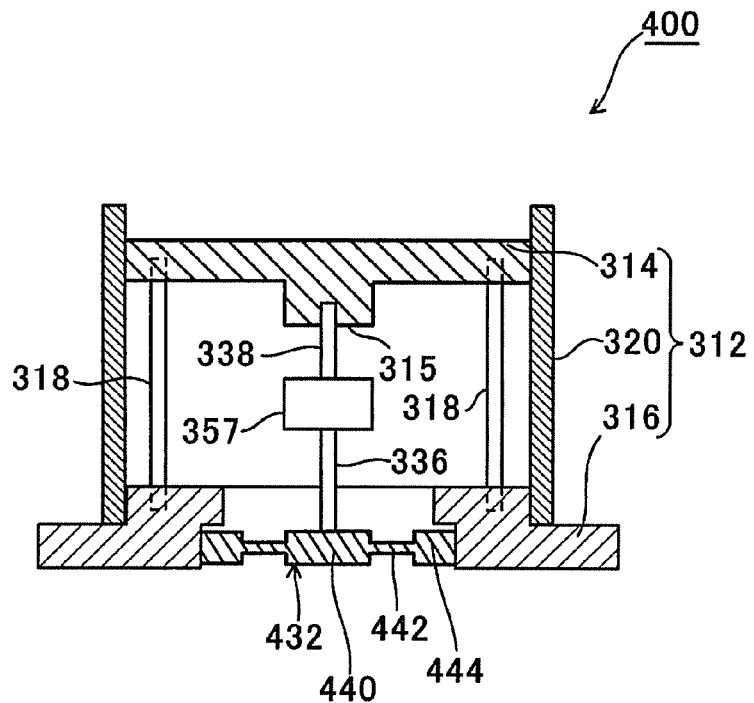
FIG. 12 is a sectional view of a pressure sensor according to a seventh embodiment of the invention.
Figure 13:
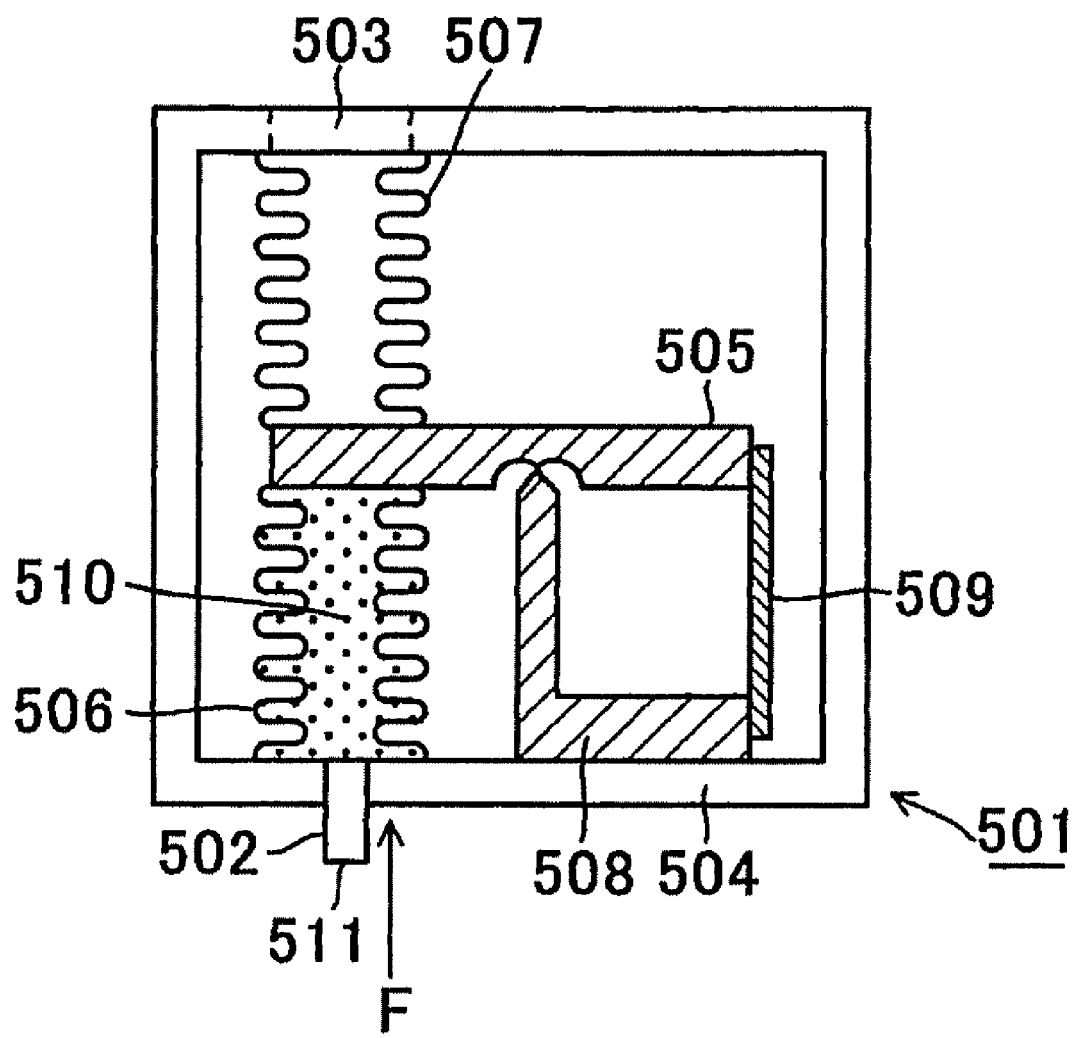
FIG. 13 is a schematic view showing a structure of a related-art pressure sensor.

FIG. 12 shows a pressure sensor 400 according to a seventh embodiment of the invention. While the diaphragm 332 according to the sixth embodiment has the circumferential groove 342 dug on one surface thereof, a diaphragm 432 according to the seventh embodiment has circumferential grooves 442 dug on both surfaces thereof. Except for that point, the seventh embodiment is the same as the sixth embodiment, so same elements will be assigned same reference numerals and will not be described.

In the pressure sensor 400 according to the seventh embodiment, the circumferential groove 442 is dug into both surfaces of an area surrounding a center area 440 of the diaphragm 432, and the center area 440 and a peripheral area 444 are thick portions and the portion on which the circumferential grooves 442 are made are relatively thin. Therefore, even if the diaphragm 432 receives pressure and thus becomes distorted, the flatness of the center area 440 thereof is maintained. Thus, a force in the axis direction is more accurately transmitted to the center shaft 336 connected to the center area 440. As a result, the detecting accuracy is improved. In particular, the front surface and back surface of the diaphragm 432 are symmetrical, so the diaphragm 432 is easy to assemble as a component.

The entire disclosure of Japanese Patent Application Nos. 2008-153254, filed Jun. 11, 2008 and 2009-027763, filed Feb. 9, 2009 are expressly incorporated by reference herein.

What is claimed is:

1. A pressure sensor comprising:
a housing;
a pair of pressure input orifices coaxially disposed on opposed end face plates of the housing;
first and second diaphragms each having an outer surface serving as a pressure receiving surface and sealing the pair of the pressure input orifices;
a force transmitting unit connecting central areas of inner surfaces of the diaphragms inside the housing; and
a pressure sensitive element having a first end connected to an intermediate portion of the force transmitting unit and a second end connected to the housing, the pressure sensitive element having a detecting axis disposed in parallel with an axis orthogonal to the pressure receiving surfaces of the diaphragms, wherein
by making grooves on flat plates, the diaphragms are formed so that the central areas to which the force transmitting unit is connected are made thicker than areas surrounding the central areas.

2. A pressure sensor comprising:
a housing;
a pressure input orifice disposed at a first end face plate of the housing;
a diaphragm having an outer surface serving as a pressure receiving surface, and sealing the pressure input orifice;
a force transmitting unit disposed on an axis orthogonal to the pressure receiving surface of the diaphragm inside the housing, the force transmitting unit being connected to a central area of an inner surface of the diaphragm and a second end face plate opposed to the first end face plate; and
a pressure sensitive element having a first end connected to an intermediate portion of the force transmitting unit and a second end connected to the housing, the pressure sensitive element having a detecting axis set to be coaxial with an axis orthogonal to the pressure receiving surface of the diaphragm, wherein
by making a groove on a flat plate, the diaphragm is formed so that the central area to which the force transmitting unit is connected is made thicker than an area surrounding the central area.

3. The pressure sensor according to claim 1, wherein
a supporting pole is provided in parallel with the detecting axis in the housing.

4. The pressure sensor according to claim 1, wherein
the force transmitting unit is a center shaft, and
the pressure sensitive element is disposed in parallel with the center shaft.

5. The pressure sensor according to claim 1, wherein
the diaphragm is fitted into a recess made on an outer surface of an end face plate of the housing so that the diaphragm is flush with the end face plate.

6. The pressure sensor according to claim 1, wherein
the groove is made on one surface of the diaphragm.

7. The pressure sensor according to claim 1, wherein
the one surface on which the groove is made is a surface to which the force transmitting unit is connected.

8. The pressure sensor according to claim 1, wherein
the area surrounding the central area is formed by etching.

9. The pressure sensor according to claim 1, wherein
the pressure sensitive element includes:
base portions provided on both ends thereof; and
a vibrating portion provided between the base portions.

10. A pressure sensor comprising:
a housing including first and second cases and a third case, the first and second cases forming opposed end face plates, the third case surrounding the first and second cases so that the third case forms a side face member;

first and second diaphragms sealing pressure input orifices opened at the first and second cases;

a center shaft connecting central areas of the first and second diaphragms in the housing so that the center shaft and the first and second diaphragms are integral with one another so as to enable a force to be transmitted;

a movable pedestal fixed to the center shaft;

a fixing pedestal provided on an inner surface of the housing;

a pressure sensitive element having both ends attached to the movable pedestal and the fixing pedestal, the pressure sensitive element having a detecting axis set to be in parallel with the center shaft; and a plurality of supporting poles disposed around the center shaft, the supporting poles connecting the first and second cases, wherein by making grooves on flat plates, the diaphragms are formed so that the central areas to which the center shaft is connected are made thicker than areas surrounding the central areas.

11. The pressure sensor according to claim 10, wherein the groove is made on one surface of the diaphragm.

12. The pressure sensor according to claim 10, wherein the one surface on which the groove is made is a surface to which the force transmitting unit is connected.

13. The pressure sensor according to claim 10, wherein the area surrounding the central area is formed by etching.

14. The pressure sensor according to claim 10, wherein the pressure sensitive element includes:
  base portions provided on both ends thereof; and
  a vibrating portion provided between the base portions.

15. The pressure sensor according to claim 2, wherein a supporting pole is provided in parallel with the detecting axis in the housing.

16. The pressure sensor according to claim 2, wherein the force transmitting unit is a center shaft, and the pressure sensitive element is disposed in parallel with the center shaft.

17. The pressure sensor according to claim 2, wherein the diaphragm is fitted into a recess made on an outer surface of an end face plate of the housing so that the diaphragm is flush with the end face plate.

18. The pressure sensor according to claim 2, wherein the groove is made on one surface of the diaphragm.

19. The pressure sensor according to claim 2, wherein the one surface on which the groove is made is a surface to which the force transmitting unit is connected.

20. The pressure sensor according to claim 2, wherein the area surrounding the central area is formed by etching.

21. The pressure sensor according to claim 2, wherein the pressure sensitive element includes:
  base portions provided on both ends thereof; and
  a vibrating portion provided between the base portions.

22. The pressure sensor according to claim 11, wherein the one surface on which the groove is made is a surface to which the force transmitting unit is connected.

23. The pressure sensor according to claim 11, wherein the area surrounding the central area is formed by etching.

24. The pressure sensor according to claim 11, wherein the pressure sensitive element includes:
  base portions provided on both ends thereof; and
  a vibrating portion provided between the base portions.

* * * * *